May 27, 1969      A. R. MILLS      3,446,529

MODEL VEHICLES

Filed Jan. 20, 1967

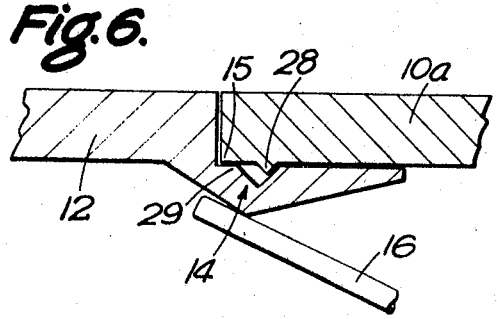
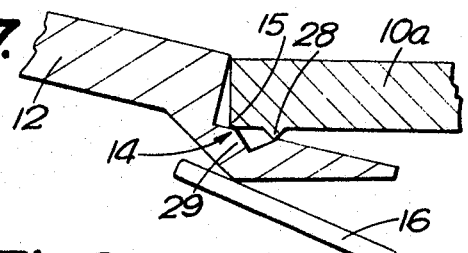
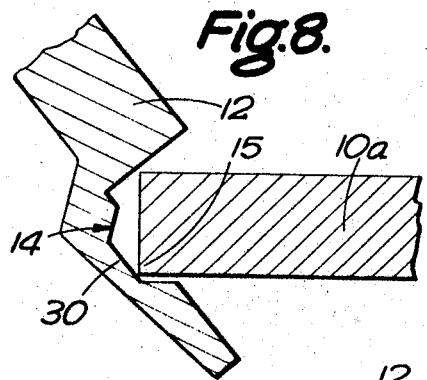
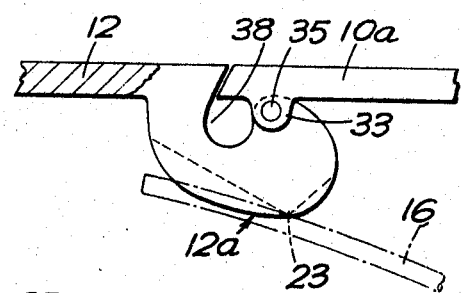
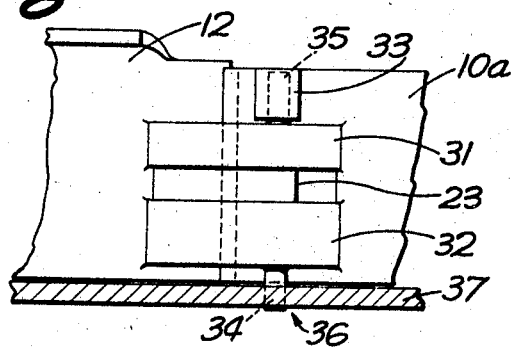

United States Patent Office 3,446,529
Patented May 27, 1969

3,446,529
MODEL VEHICLES
Aubrey Robert Mills, London, England, assignor to Die Casting Machine Tools Limited, London, England, a British company
Filed Jan. 20, 1967, Ser. No. 610,558
Int. Cl. B60j 5/04; E05f 1/10; F16f 1/06
U.S. Cl. 296—146                                9 Claims

ABSTRACT OF THE DISCLOSURE

A model vehicle having an openable door, the door having at its inner side edge an extension which in the closed position of the door extends behind the adjacent margin of the vehicle's body, the extension having on its inside surface a ridge parallel to the axis or axes about which the door opens, one half of a V-shaped spring, mounted in the vehicle, being disposed to engage the ridge to resist movement of the door, the ridge being forward of the axis or axes when the door is closed and rearward thereof when the door is fully open.

---

This invention relates to model vehicles and has for its principal object to provide an improved construction of openable doors for a model vehicle.

Particularly for small model cars and other road vehicles, it is desirable to provide openable doors. It has been proposed to form a door for a model car with the hinge constituted by a portion on or near the front edge of the door which is curved about a vertical axis and which is sandwiched between a pillar on the car body having a convex cylindrical surface and a resilient insert in the vehicle. The vehicle's body may be a die cast metal structure; the insert is conveniently a resilient synthetic plastic moulding simulating the seats, floor, etc. of the car. Such a construction is not easy to assemble if there is more than one openable door since all the doors have to be held in the correct position, the insert put in the vehicle and the insert then secured in position by a wheel carrying chassis.

Another proposal is to provide a side door which hinges about a vertical axis or axes disposed in the thickness of the vehicle body or door around an axis or axes disposed behind and in the intermediate neighborhood of the inside face of the bodywork or door, the door having at one side edge an extension which in the closed position of the door extends behind the adjacent margin of the vehicle body there being provided spring means engaging the extension to hold the door in place while permitting the door to open. Such a construction is more satisfactory than that proposed above; there remains however the problem that the resultant force exerted by the spring on the door surface may not always be directed with respect to the door in the most favourable direction for ensuing that the door stays properly open or closed.

According to the invention, a model vehicle has a door openable about an axis or axes and having at its inner side edge an extension which in the closed position of the door extends behind the adjacent margin of the vehicle's body, the extension having on its inside surface a ridge parallel to said axis or axes, and a substantially straight spring element which bears against the apex of the ridge, the ridge being located forwardly of the said axis or axes when the door is in the closed poistion and rearwardly of the said axis or axes when the door is in a fully open position.

As will be pointed out more particularly hereinafter, the present invention, by providing that the application of the retaining force of the straight spring element is in front of the pivot axis or axes of the door, when the door is in the closed position, ensures that the turning moment on the door exerted by the straight spring element tends to close the door more firmly. In the open position the turning moment exerted by the straight spring element on the door will be in a direction serving to maintain the door properly open.

The door may be a side door; a pair of such doors may be provided, one on each side of the vehicle, there being a V-shaped spring with the apex of the V mounted on the body of the car and the two arms of the V each forming one straight spring element pressing against a door. The spring may be a wire spring twisted to form a short helix at the base of the V, the helix fitting over a projection on the internal surface of the car body or a member in the car body. For doors with their hinges on the front edges of the door, the V-shaped spring may conveniently be mounted in the simulated bonnet of the vehicle. Some toy vehicles have an openable bonnet within which is a member simulating the engine of the car and, in this case, the V-shaped spring may be mounted on the underside of this member.

It should be made clear that the terms "forwardly" and "rearwardly" as used in this specification relate to a vehicle in which a door is hinged at its front end that is to say the leading end with respect to the movement of the vehicle. For the alternative case in which the door is hinged at its trailing or rear edge it will be understood that the terms "forwardly" and "rearwardly" when applied to the ridge and elsewhere have their opposite meanings.

The following is a description of two embodiments of the invention, reference being made to the accompanying drawings in which:

FIGURES 6 and 7 illustrate a modification of the vehicle of FIGURES 1 to 5;

FIGURE 8 illustrates another modification of the vehicle of FIGURES 1 to 5; and

FIGURES 9 and 10 illustrate another embodiment of the invention.

Figure 1:
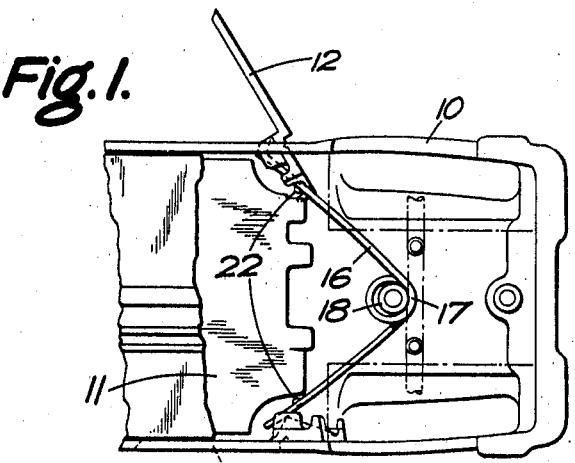
FIGURE 1 is an underside plan of part of a model car, with the wheel-carrying chassis removed, embodying the invention.
Figure 4:
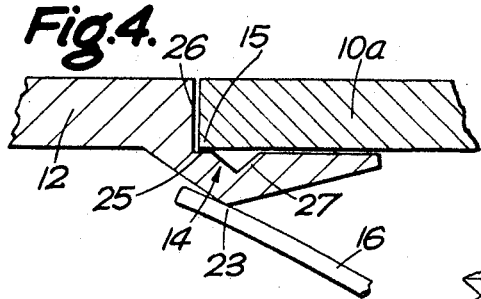
FIGURES 4 and 5 illustrate part of the door and body in more detail.
Figure 5:
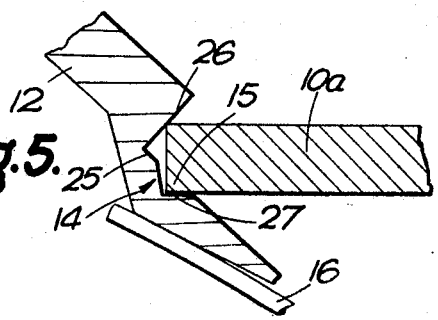

Referring to FIGURES 1 to 5, the vehicle has a die cast metal body 10 within which is a resilient moulded plastic insert 11 simulating the seats and interior structure of the vehicle. In this particular embodiment, the two front doors 12, 13 of the vehicle are openable. The doors and the control means associated with each are similar in construction and only the door 12 and the control means associated therewith will be described. This door has, near its forward edge a generally V-shaped vertical groove 14 carried by an extension 12a which extends from the inside side edge of the door 12 adjacent the inside surface of the margin 10a of the vehicle body (see in particular FIGURE 4) to form with the door 12 itself a rebate which in the closed position shown in FIGURE 4 accommodates the margin 10a of the body of the vehicle. The vertical groove 14 receives the inside corner 15 of the margin 10a when the door is in the open position as shown in FIGURE 5. The door is held in position by a straight element 16 which, as shown in FIGURE 1, is one arm of a V-shaped wire spring having the wire formed with two or three turns of a helix 17 at the apex of the V which turns grip a projection 18 on the underside of a member in the bonnet of the vehicle. This member is shaped on its upper surface to simulate an engine as, in this particular model, the bonnet is openable. The arms 16 of the spring are substantially straight and each bear respectively against a ridge 23 formed on the inside of the extension 12a of the door 12 and against a corresponding ridge on the door 13.

Figure 2:
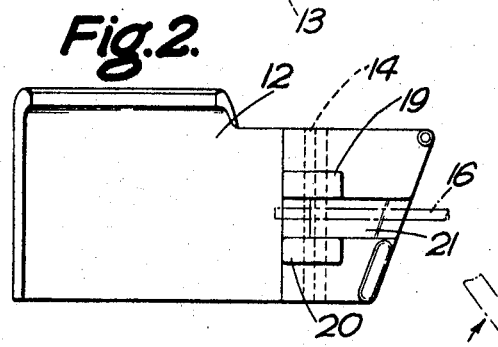
FIGURE 2 is an inside elevation of a door of the vehicle.
Figure 3:
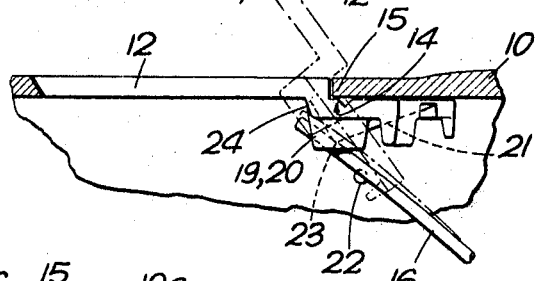
FIGURE 3 is a horizontal section through part of the body of the vehicle showing the door closed in full lines and open in chain lines.

In FIGURE 4 it will be seen that the ridge 23 lies in front of the inside corner 15 so that in the closed position of the doors the straight spring element exerts a turning moment on the door which tends to press the extension more closely against the margin 10a of the vehicle's body. The straight spring element 16 is located on each door by two lugs 19 and 20 lying one above and one below the straight spring element as shown in FIGURE 2. The door has a surface 21 between these lugs which as is most clearly seen in FIGURE 3 slopes in the forward direction, away from the centre line of the vehicle to provide a reduced thickness for the extension 12a. When the door is fully open the straight spring element 16 may lie flat along the surface 21 but this is not essential and it is merely necessary to ensure that the point 23 is rearwards of the corner 15, as shown in FIGURE 5. Each door therefore has two stable positions: one open and the other closed.

A stop peg 22 is provided for each door to limit the opening movement of the respective door, the peg being formed on the body structure 10 of the car. The surface 21 allows the door to open to a greater extent than if the two sides of the extension of the door were parallel.

Referring now more particularly to FIGURES 4 and 5: these figures illustrate the door and adjacent margin of the body in more detail. FIGURE 4 shows the door in the closed position, the spring element 16 holding the point 23 forwardly of the corner 15. A flat 25, which is between the corner of the rebate formed by the door and its extension and the groove 14, bears against the inside face of the margin 10a to prevent the door from moving outwardly under the pressure of the spring 16. The flat 25 must not be wide enough to prevent the door from closing. FIGURE 5 shows the door in the open position in which the ridge 23 is held rearward of the corner 15 and the flat 27 which is the front side of the groove 14 co-operates with the door jamb 26 and the margin 10a to prevent the door from moving away from the desired position under the spring pressure.

In FIGURES 6 and 7 is illustrated a modification in which a small V-section ridge 28 is provided on the inner surface of the margin 10a. When the door 12 has a relatively thick section at the trailing edge the V-section 28 serves to assist the closing of the door by lifting the corner 29 past the corner 15. It also serves to lift the other end of the door away from a corresponding rebate formed in the body of the vehicle.

FIGURE 8 illustrates another modification of the door and would be useful when the car body is relatively thick in section. In this figure, the width of the V-shaped groove 14 is extended and the bottom of the groove is flattened to form the flat 30 which compensates for the thickness of the body and allows the door to open to the same extent as can thinner doors.

FIGURES 9 and 10 show a plan view and a side view respectively of an alternative embodiment of the invention. In this embodiment, the door is mounted within the vehicle by a pair of pivot pins vertically disposed one above the other. In FIGURES 9 and 10, the lugs 19 and 20 are replaced by the lugs 31 and 32 of the door extension, being formed integrally with the main part of the extension 12a. The main part is formed with the ridge 23 and sides 21 and 24 as before, between the lugs 31 and 32. The upper lug 31 bears an upper pivot pin 33 which engages a bushing in a lug 35 formed on the inside face of the margin 10a. The pin 33 is located rearwardly of the ridge 23 when the door is closed. The lower lug 32 carries a downwardly directed, integrally formed, pivot pin 34 vertically below the pin 33. The pin 34 extends below the lower edge of the body to engage a hole 36 in the vehicle's chassis 37.

The chassis 37 is formed separately from the body and is secured to the body to retain the door 12 in place after the door has been partially secured by the pin 33 engaging the bushing in the lug 35. In this embodiment, the pins 33 and 34 hold the door in place and the straight spring element 16 (shown in chain lines in FIG. 9) bears against the ridge 23 merely to provide forces resisting movement of the door or holding the door open or closed, depending on the position of the door. The end face 30 of the margin 10a is cut away to allow the door to open; the extension 12a has a recess 38 for the same purpose.

I claim:
1. In a model vehicle:
a body having a part defining a pivot axis means;
a door co-operating with said part to be openable about said pivot axis means, said door having an extension that when the door is closed extends behind the adjacent margin of said body, said extension having on its inside surface a ridge extending parallel to said pivot axis means; a support in said body;
a spring element mounted on the support and having a substantially straight part disposed to bear against the apex of the ridge, the door including the extension arranged and disposed to enable the ridge being located on one side of said pivot axis means when the door is closed and on the other side of said pivot axis means when the door is fully open.

2. The structure defined in claim 1 wherein: said body has two longitudinal sides each having a part defining a pivot axis means; there are two doors, each co-operating with a respective part to be openable about the respective pivot axis means; and including a generally V-shaped spring whose apex is mounted by said support and whose arms each constitute a spring element having a substantially straight part, the support being located forwardly of said pivot axis means.

3. The structure defined in claim 1, wherein said extension forms with the door itself a rebate which receives the adjacent margin of the body when the door is closed.

4. The structure defined in claim 3 wherein said pivot axis is at least partly constituted by the inside corner of said adjacent margin and said extension has on its outer surface a vertical groove which receives said inside corner when the door is fully open.

5. The structure defined in claim 4 wherein said adjacent margin defines a further ridge which is smaller than, and is received in, said groove when the door is closed, said further ridge engaging said extension during opening of the door to push the outside surface of the extension away from said inside corner.

6. The structure defined in claim 1, wherein the door bears a pair of axially aligned pivot pins and said body is formed with two apertures each disposed to receive one of said pivot pins and defining said pivot axis means.

7. The structure defined in claim 6 wherein said pins are formed on said extension.

8. The structure defined in claim 7 wherein the vehicle has a chassis defining one of apertures.

9. The structure defined in claim 8 wherein said chassis is formed separately from said body.

References Cited

UNITED STATES PATENTS 2,105,071  1/1938  Bowers _____ 49—386

PHILIP GOODMAN, Primary Examiner.

U.S. Cl. X.R.

49—386; 267—1